United States Patent [19]

Freedman et al.

[11] Patent Number: 4,812,035

[45] Date of Patent: Mar. 14, 1989

[54] AM-FM LASER RADAR

[75] Inventors: Nathan Freedman, West Newton; Wayne H. Keene, South Natick; Albert V. Jelalian, Bedford, all of Mass.

[73] Assignee: Raytheon Company, Lexington, Mass.

[21] Appl. No.: 929,686

[22] Filed: Nov. 3, 1986

[51] Int. Cl.$^4$ .............................................. G01C 3/08
[52] U.S. Cl. ........................................ 356/5; 342/87; 342/122; 342/127; 342/130; 367/88; 367/102
[58] Field of Search ..................... 342/83, 86, 87, 122, 342/127, 130; 356/5; 367/88, 102

[56] References Cited

U.S. PATENT DOCUMENTS

| | | | |
|---|---|---|---|
| 2,714,206 | 7/1955 | Blitz | 342/130 |
| 3,166,747 | 1/1965 | Adrian | 342/130 |
| 3,168,735 | 9/1962 | Cartwright | 343/12 |
| 3,360,987 | 7/1964 | Flower et al. | 73/71.3 |
| 3,508,828 | 11/1966 | Froome et al. | 356/5 |
| 3,728,025 | 4/1973 | Madigan et al. | 356/5 |
| 3,752,582 | 8/1973 | Troll et al. | 356/5 |
| 3,945,729 | 3/1976 | Rosen | 356/5 |
| 4,003,053 | 1/1977 | Mengel | 343/14 |
| 4,068,951 | 1/1978 | Froome et al. | 356/5 |
| 4,146,328 | 3/1979 | Hullein et al. | 356/5 |
| 4,176,351 | 11/1979 | DeVita et al. | 343/9 R |
| 4,212,012 | 7/1980 | Manoogian et al. | 343/7 A |
| 4,241,347 | 12/1980 | Albanese et al. | 342/130 |
| 4,611,912 | 9/1986 | Falk et al. | 356/5 |
| 4,666,295 | 5/1987 | Duvall et al. | 356/5 |

OTHER PUBLICATIONS $CO_2$ Laser Radar Flight Test Results, *Proceedings of IRIS Active Systems, Dec., 1983, pp. 387–389.*

Primary Examiner—Stephen C. Buczinski
Attorney, Agent, or Firm—Christopher L. Maginniss; Richard M. Sharkansky

[57] ABSTRACT

A laser radar system wherein a beam of continuous wave (CW) electromagnetic energy is generated with frequency modulation (FM) and amplitude modulation (AM) being imposed thereon to produce an amplitude and frequency modulated, continuous wave beam of energy. The AM-FM CW beam is transmitted toward a selected target, portions of the transmitted beam being reflected by the target and received along with portions of the transmitted beam reflected by unselected targets and atmospheric clutter. A first signal is produced in response to the frequency modulation on the received beam portions reflected by the selected target, such first signal representing the approximate range of the selected target and substantially resolving the selected target from unselected targets and atmospheric clutter and having a relatively long ambiguous range interval. A second signal is produced in response to the amplitude modulation on the received beam portions reflected by the selected target, the second signal representing the accurate range of the selected target within a relatively short ambiguous range interval. The second signal provides poor resolution between the selected target and the unselected targets and atmospheric clutter. The first and second signals are combined to produce an output signal having the relatively high resolution and long ambiguous range interval of the first signal and providing the accurate selected target range measurement of the second signal.

12 Claims, 3 Drawing Sheets

AM-FM LASER RADAR

The government has rights in this invention pursuant to Contract No. F33615-80-C-1039 awarded by the Department of the Air Force.

BACKGROUND OF THE INVENTION

The present invention relates generally to laser radar system, and more particularly to continuous wave (CW) laser radar systems.

As is known, CW laser radar systems have a wide variety of applications, one of such applications being to provide range tracking of a target as well as imaging and classification of such target, that is, providing details of the shape of the target to permit such target to be identified. Such application requires the CW laser radar to provide precise target range information. A conventional CW laser radar utilized for such application provides amplitude modulation (AM) of the transmitted CW laser beam by passing the CW beam through a modulator, such as an electro-optic crystal, biased with a time-varying signal at the AM frequency. Target range is measured by determining the phase shift of the AM envelope of the target reflected return signal relative to a reference AM envelope signal. Since phase shift measurement accuracy of a few degrees may be conventionally obtained, and since very high modulation frequencies (i.e., on the order of 1 MHz) may be achieved using conventional AM electro-optic crystals, amplitude modulated CW laser radar systems are capable of measuring target range quite accurately.

However, amplitude modulated CW laser radar systems with high AM frequencies have poor target resolution. That is, it is difficult to resolve a selected target from other, unselected targets or from atmospheric clutter such as near-field clutter through the use of amplitude modulation. Such poor resolution is due to the fact that scatterers of energy at different ranges (for example, selected and unselected targets, atmospheric clutter, etc.) will return signals to the radar system which have AM envelopes at different relative phases with respect to the reference AM envelope. Thus, the measured phase shift between the return signals and the reference signal is an average phase shift contributed to by several sources other than the selected target, thereby substantially preventing the selected target from being distinguished from other targets or from atmospheric clutter. Additionally, since the AM frequency is typically selected to be relatively high in order to obtain accurate target range measurements, the AM waveform has a relatively short ambiguous range interval. The AM frequency could be lowered to increase the ambiguous range interval, but the AM waveform would have poor accuracy and would still have poor target resolution.

Another CW laser radar system utilizes frequency modulation (FM) rather than AM to provide target range information. The CW signal is periodically "chirped" in frequency at a predetermined repetition rate and by a predetermined amount to thereby impose FM on the CW beam. The repetition frequency of the FM modulation (i.e., the FM modulation frequency) is typically much lower than the modulation frequency in conventional AM systems, leading to long ambiguous range intervals. Further, the FM waveform provides relatively high target resolution according to the FM modulation frequency. Thus, the FM radar system is capable of distinguishing a selected target from other targets and from near-field atmospheric clutter. However, due to inherent FM bandwidth and chirp limitations, inaccuracies are experienced in imposing FM on a CW laser beam. Thus, the accuracy to which target range may be measured with an FM-CW laser beam may not be sufficient to provide accurate information on the details of the target, thereby decreasing the probability of measuring target characteristics and/or degrading the capability of the laser radar system to identify and classify the target.

SUMMARY OF THE INVENTION

In accordance with the present invention, a radar system is provided comprising means for generating a beam of continuous wave electromagnetic energy, the generating means comprising means for producing a frequency and amplitude modulated beam of continuous wave energy. Such producing means comprises: means for modulating the frequency of the continuous wave beam from a nominal frequency; and means for modulating the amplitude of such continuous wave beam from a nominal amplitude. The radar system further comprises: means for directing the frequency- and amplitude-modulated CW beam toward a target; means for receiving portions of the directed beam reflected by the target; means, responsive to the frequency modulation of the received beam portions, for producing a first signal representative of the approximate range of the target; and means, responsive to the amplitude modulation of the received beam portions, for producing a second signal representative of variations in the approximate range of the target. With such arrangement, the first signal provides an approximate or "coarse" measurement of the range of a selected target such approximate range measurement yielding high resolution between the selected target and unselected targets and atmospheric clutter. The approximate range measurement also has a relatively long ambiguous range interval. The second signal provides an accurate measurement of the range of the selected target, such accurate range measurement providing poor resolution between the selected target and unselected targets and atmospheric clutter. The first and second signals are combined, with the second signal providing a "vernier" range measurement for the approximate target range measurement provided by the first signal, thereby allowing accurate determination of the range of the target and enabling identification of the classification of the target. The resultant target range measurement provides high resolution between the selected target and unselected targets and atmospheric clutter, such resultant range measurement also having a long ambiguous range interval.

BRIEF DESCRIPTION OF THE DRAWINGS

The foregoing features of the present invention, and the advantages thereof, may be fully understood from the following detailed description read in conjunction with the accompanying drawings wherein.

DESCRIPTION OF THE PREFERRED EMBODIMENT

Figures 1, 4:
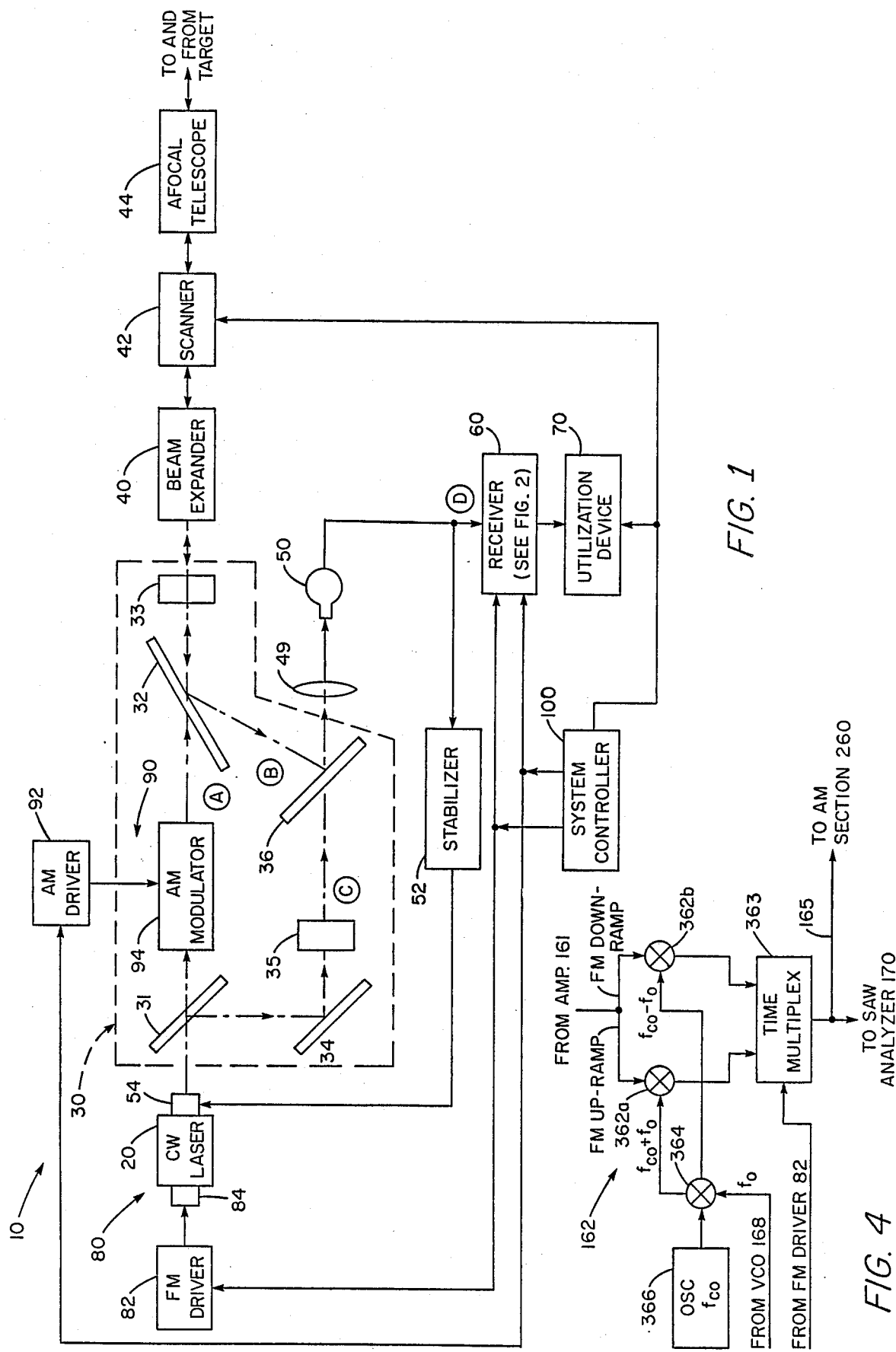
FIG. 1 is a schematic and block diagram of a preferred embodiment of a laser radar system according to the present invention.
FIG. 4 is a schematic and block diagram of a preferred embodiment of a component of the receiver portion of FIG. 2.

Referring to FIG. 1, a preferred embodiment of the amplitude-modulated-frequency-modulated (AM-FM) CW laser radar system 10 of the present invention is shown. AM-FM laser radar system 10 comprises CW laser 20, here a $CO_2$ laser producing a continuous wave beam of electromagnetic energy having a nominal wavelength (approximately 10.6 μm) and frequency. The output of CW laser 20 is coupled through interferometer section 30, beam expander section 40, a conventional beam scanner section 42 and afocal telescope 44 and transmitted to a target, not shown. Portions of the transmitted beam reflected by such target are received by afocal telescope 44, coupled through scanner 42 and beam expander 40 (which in this direction functions to compress the diameter of the beam), and directed to interferometer 30, where such received portions are combined in a manner to be described with a local oscillator (L.O.) beam, here derived from CW laser 20. The combined beams are applied to detector 50, which produces a beat frequency signal representative of the target range and Doppler velocity. Such beat frequency signal is fed to receiver section 60, where here the range of the target is calculated and applied to utilization device 70, which here comprises a CRT, for imaging the target thereon with sufficient accuracy and resolution to enable an operator to identify the shape of the target with sufficient certainty to "classify" such target. The scanning of the CRT and of scanner 42 are synchronized in a conventional manner by a control signal generated by system controller 100. Alternately, utilization device 70 may comprise a computer which is programmed to automatically classify a target according to the signal coupled thereto from receiver section 60. To obtain the precise target range information necessary for such target identification and classification, radar system 10 further comprises a frequency modulator (FM) unit 80 and an amplitude modulator (AM) unit 90 to simultaneously produce frequency modulation (FM) and amplitude modulation (AM) on the CW beam produced by laser 20. Receiver section 60 responds in a manner to be described to the frequency modulation on the received portions of the target-reflected AM-FM beam to produce a first signal representative of the approximate range of the target, such first signal having high resolution and relatively long ambiguous range intervals, thereby distinguishing the target from other targets and from atmospheric clutter. The receiver 60 also responds to the amplitude modulation on such received AM-FM beam to produce a second signal representative of the accurate range of the target, such second signal having poor resolution and short ambiguous range intervals. That is, the second signal represents variations in the approximate range of the target. The first and second signals are applied to utilization device 70, which utilizes the second accurate but poorly resolved and ambiguous range signal as a "vernier" on the first inaccurate but highly resolved and unambiguous range signal to provide a target range measurement which is accurate, has high resolution and is unambiguous over long range intervals. System controller 100 synchronizes such received electronic signal with the scanning of scanner 42 in a conventional manner, thereby allowing the highly resolved and unambiguous range signal to be displayed on a CRT-type screen to allow an operator to identify the shape of such target precisely enough to determine what the target is (i.e., to "classify" the target), with such target also being resolved from other targets and from atmospheric clutter.

Frequency modulator unit 80 here comprises FM driver 82 and piezoelectric transformer (PZT) 84 controlling the position of one of the end mirrors (not shown) in CW laser 20. FM driver 82 comprises a conventional waveform generator responsive to a signal from system controller 100 here to apply a continuous, periodic electrical control signal, here a triangular waveform having an up-ramp and a down-ramp to PZT 84. PZT 84 responds to such control signal by periodically moving the position of the end mirror of laser 20 coupled thereto, thereby continuously changing the optical length of the resonant cavity of laser 20 from a nominal length in accordance with the shape of the periodic waveform (here triangular) applied to PZT 84. Laser 20 responds to the movement of PZT 84 by changing the frequency of the CW beam produced thereby from the nominal frequency by an amount corresponding to the control signal applied to PZT 84. Thus, here laser 20 resonates at continuously different frequencies and thus periodically modulates the frequency of the CW beam produced by laser 20. Here, the frequency of the CW beam is modulated in triangular modulation pattern corresponding to the shape of the waveform produced by FM driver 82.

The frequency modulated CW beam (FM-CW) is polarized by laser 20 to a predetermined polarization, here linear polarization such as p-polarization, by conventional means, such as by a Brewster plate (not shown) disposed within laser 20. The p-polarized FM-CW beam is directed to interferometer section 30 which comprises beamsplitter 31, Brewster plate 32, quarter-waveplate 33, mirror 34, half-waveplate 35 and beam combiner 36, arranged as shown. Also included in interferometer section 30 is AM unit 90, comprising AM driver 92 and AM modulator 94. Beamsplitter 31 divides the FM-CW beam incident thereon from CW laser 20 into a transmit beam and a local oscillator (L.O.) beam, each beam having a nominal amplitude. The transmit beam is applied to Brewster plate 32 through AM modulator 94, which here comprises a conventional electro-optic crystal such as a Cd-Te crystal. AM driver 92 responds to a signal from system controller 100 to here apply a continuous, periodic electrical control signal, here a sine wave, to AM modulator 94 to vary the indicies of refraction of AM modulator 94 in accordance with such continuous, periodic electrical control signal to produce corresponding changes in the amplitude of the FM-CW beam coupled by AM modulator 94 to a Brewster plate 32, here by attenuating the nominal amplitude of the transmit beam in accordance with such control signal. Thus, AM unit 90 continuously modulates the amplitude of the FM-CW beam applied to Brewster plate 32. The AM-FM CW beam applied to Brewster plate 32 remains p-polarized and thus coupled directly therethrough and is incident on quarter-waveplate 33, which rotates such p-polarized beam to produce right-circular-polarization on the beam coupled to beam expander section 40.

The L.O. beam is p-polarized and reflects from mirror 34 through half-waveplate 35 and is incident on beam combiner 36. Half waveplate 35 rotates the polarization of the L.O. beam incident on combiner 36 from p-polarization to s-polarization for purposes to be described. It is here noted that the L.O. beam may be generated from a separate CW laser, not shown, rather than from CW laser 20. In such case, the separate laser may also be frequency modulated, as is known, such as by FM unit 80. The nominal frequency of the CW L.O. beam may be adjusted to be offset from that of CW laser 20, as is known.

The diameter of the laser beam is increased by beam expander 40, the expanded beam being transmitted toward a target by scanner 42 and afocal telescope 44. Scanner 42 responds in a conventional manner to a control signal from controller 100 to scan the transmitted beam in a predetermined pattern, as is known. Portions of the right circularly polarized, transmitted beam which are reflected by the target are received by afocal telescope 44 and directed to beam expander section 40 via scanner 42 as a left circularly polarized beam. Beam expander section 40 compresses such received portions into a narrow beam and directs the beam through quarter-waveplate 33 onto Brewster plate 32. Quarter-waveplate 33 rotates the polarization of the left-circularly polarized target-reflected beam to s-polarization, which is reflected by Brewster plate 32 onto beam combiner 36. The s-polarized target return beam is mixed with the s-polarized L.O. beam by combiner 36, and the resultant beam directed through lens 49 onto optical detector 50. Optical detector 50 is a conventional photo-voltaic or photoconductive device which produces an electrical output signal in response to the beat frequency between the target-reflected-return beam and the L.O. beam, as is known. In a homodyne system, such as is shown in FIG. 1, wherein the same laser 20 produces the transmitted and L.O. beams, such beat frequency signal will have a frequency component due to the Doppler velocity of the target ($f_D$) and a frequency component due to target range ($f_R$) It is noted that if a separate laser is used to produce an L.O. beam having a frequency offset from the CW frequency of laser 20 (i.e., in a heterodyne system), such beat frequency signal will have an additional frequency component corresponding to such offset frequency. The beat frequency signal produced by detector 50 is coupled to receiver section 60 for processing in a manner described below.

Detector 50 also produces a signal representative of the frequency of the L.O. beam and applies such signal to stabilizer 52 to maintain the frequency stability of CW laser 20 by controlling the position of the second end mirror (not shown) with piezoelectric (PZT) stack 54 to thereby adjust the resonant frequency of laser 20 by varying the optical length of the resonant cavity of laser 20, as is known. Here, stabilizer 52 superimposes an AC signal, here having a frequency of 1 KHz, on a DC positioning signal nominally applied to PZT stack 54 by stabilizer 52. Such AC signal dithers the position of the cavity mirror driven by PZT stack 54 in order to scan laser 20 about the center of the selected laser transition line (such as the P-20 line) and generate an error signal to control the amplitude of the DC positioning signal applied to PZT stack 54. This is performed periodically during the operation of system 10 to maintain CW laser 20 at the center of the selected transition. A commercially available unit, such as a Lansing Research Company Model 80214, may be used as stabilizer 52. It is noted that a dedicated detector (not shown), responsive solely to the output of CW laser 20, may be used to stabilize laser 20, as is known, rather than using detector 50 for such stabilization.

Figure 2:
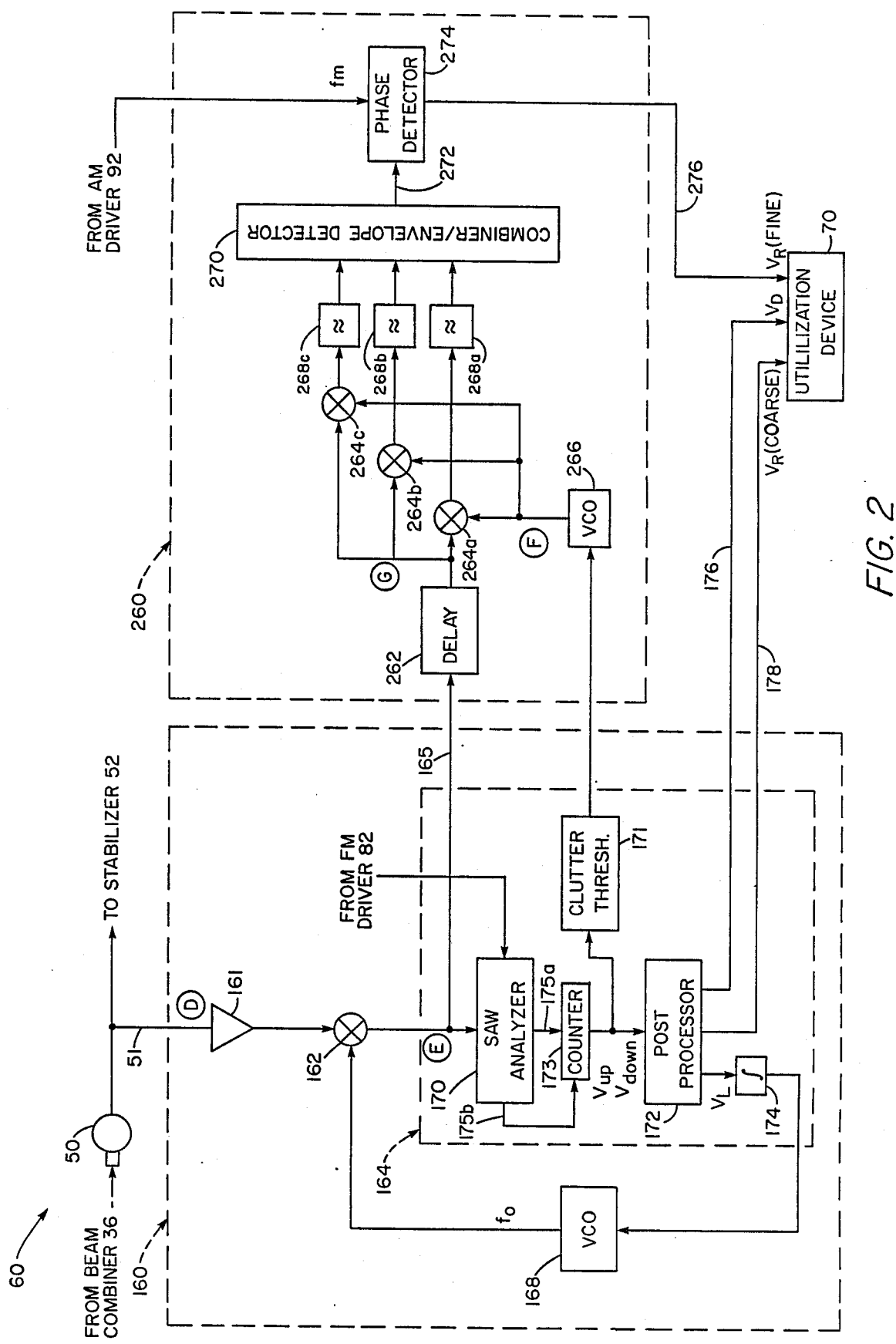
FIG. 2 is a schematic and block diagram of the receiver portion of the laser radar system of FIG. 1.

Referring additionally to FIG. 2, receiver section 60 is seen to comprise FM subsection 160 and AM subsection 260. FM subsection 160 comprises conventional input amplifier 161, which increases the power of the beat frequency signal fed to receiver 60 by detector 50. The output of amplifier 161 is coupled to the input port of mixer 162, the output port of such mixer 162 being applied to FM processor unit 164. The mixer port of mixer 162 is applied with a control signal $f_o$ from VCO 168 to maintain the average frequency of the signal produced by mixer 162 constant, thereby minimizing the required bandwidth of the devices comprising FM processor unit 164. A preferred embodiment of mixer 162 is described in detail hereinafter in connection with FIG. 4.

FM processor unit 164 here comprises a conventional SAW (surface accoustical wave) analyzer 170 which responds to the frequency of the signal applied thereto from mixer 162 to produce an output signal representative of such frequency, as is described in detail hereinafter. Other devices which perform this function, such as a spectrum analyzer, may be substituted for the SAW analyzer 170. Here, SAW analyzer 170 is manufactured by Andersen Laboratories, 128 Blue Hills Avenue, Bloomfield, Conn. 06002, and has a center frequency of $f_{SAW}$ and a predetermined bandwidth and resolution. The output of SAW analyzer 170 is coupled to postprocessor 172 which here computes three signals from the output signal of SAW analyzer 170 in a manner to be discussed: a signal $V_R$(coarse) representing the approximate range of the target; $V_D$ representing the Doppler velocity of the target; and $V_L$, a control signal coupled through integrator 174 to VCO (voltage-controlled-oscillator) 168 to adjust the output frequency of VCO 168 to hold the average frequency of the output signal from mixer 162 constant at a predetermined frequency, as will be discussed. The signal $V_R$(coarse) is an approximate measurement (i.e., is relatively inaccurate) of target range. However, as will be discussed, such approximate range measurement has relatively long ambiguous range intervals and allows high resolution between a target and atmospheric clutter and between such target and other targets. Signals $V_D$ and $V_R$(coarse) are coupled to utilization device 70, as shown, via lines 176, 178, respectively.

The output of mixer 162 is additionally coupled through cable 165 to AM subsection 260, where such signal is coupled through delay line 262 for purposes to be discussed and applied as inputs to a plurality of, here three, mixers 264a, 264b, 264c. A single output of VCO 266 is coupled to the mixer ports of mixers 264a–264c for purposes to be discussed. The input of VCO 266 is derived from the output of SAW analyzer 170 via clutter threshold 171, as shown. The output ports of mixers 264a, 264b, 264c are coupled through a plurality of narrow-band filters 268a, 268b, 268c, respectively, and are combined in conventional combiner/AM envelope detector 270 to produce a signal on line 272 which corresponds to the envelope of the amplitude modulation superimposed on the transmitted beam, and hence on the beat frequency signal. The phase of the envelope signal on line 272 is compared with the reference phase of the AM envelope signal applied onto the FM-CW output of laser 20 by AM driver 92 in phase detector 274, the difference in phase between the two signals representing an accurate measurement of the range of the target, such range measurement having poor resolution and short ambiguous range intervals, as will be discussed. That is, it is difficult to resolve one target from another or a target from atmospheric clutter with such accurate range measurement signal. Such accurate, ambiguous and poorly resolved target range signal is denoted here as $V_R$(fine) and is coupled to utilization device 70, as shown, on line 276. Alternately, the phase of the individual output signals of filters 268a–268c may be detected, rather than detecting the phase of the combined, envelope signal.

Figure 3:
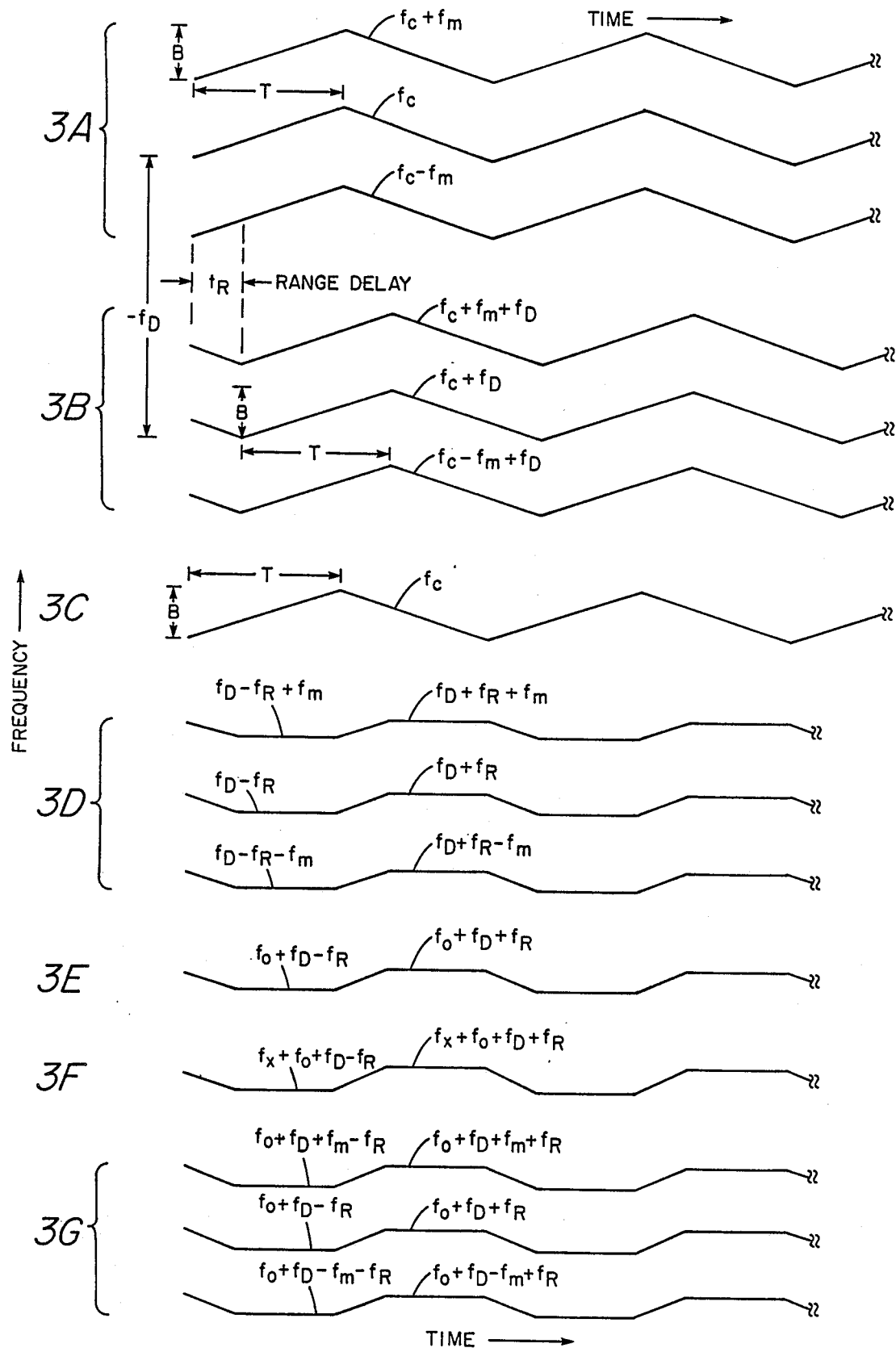
FIG. 3 illustrates frequency- vs. -time waveforms of the signals at various points in the laser radar system of FIG. 1 and are helpful in understanding the invention.

In operation, and referring also to FIG. 3, which illustrates frequency- vs. -time waveforms 3A–3G representing the transmitted and received signals at various points A-G in system 10, the AM-FM CW signal which is transmitted toward the target at point A of FIG. 1 is shown as waveform 3A. As shown, such transmitted signal comprises a carrier signal component, having a nominal frequency $f_c$, and a pair of sideband components: an upper sideband component having a nominal frequency of $f_c+f_m$; and a lower sideband component wherein the nominal frequency is $f_c-f_m$. The symbol $f_c$ denotes the carrier frequency of the CW laser output of laser 20, which for a laser having an operating wavelength of 10.6 μm, is approximately $3\times10^7$ MHz. The designation $f_m$ denotes the frequency of the amplitude modulation envelope superimposed onto the output of CW laser 20 by AM unit 90, such frequency $f_m$ typically being many orders of magnitude less than the carrier frequency $f_c$. In passing, it is noted that the range of a target as measured by an AM system is given by the well-known formula:

$$\text{RANGE} = \frac{c\theta}{4\pi f_m} \quad (1)$$

where c is the speed of light ($3\times10^8$ m/s) and $\theta$ represents the phase difference between the amplitude modulation envelope of the transmitted and received signals as determined here by phase detector 274. A little thought reveals that the above-described range measurement is ambiguous when such phase difference $\theta$ equals $2\pi$. Thus, the ambiguous target range is seen to be:

$$\text{RANGE}_{(amb)} = \frac{c}{2f_m} \quad (1a)$$

and is a short range interval for any substantial $f_m$ (such as on the order of 1 MHz).

Referring again to waveform 3A, the carrier and upper and lower sideband components each undergo a predetermined frequency excursion B within a predetermined time period T due to the frequency modulation imposed by FM modulator 80 on the CW signal generated by laser 20. The symbol T represents the duration of the up-ramp and the down-ramp produced by FM driver 82 and here is selected to yield a relatively long ambiguous range interval for target ranges measured from the FM superimposed on the CW laser beam produced by laser 20. Typically, the FM period (i.e., 2T) thus selected is such that the resulting FM modulation frequency (i.e., the rate of repetition dF/dt of the frequency modulation) is several orders of magnitude less than the AM frequency ($f_m$). A little thought thus reveals that the ambiguous range interval for the lower frequency FM signal is much greater than the ambiguous range interval for the higher frequency AM signal.

Thus, it is seen that AM modulator 90 and FM modulator 80 produce an AM-FM waveform on the CW output of laser 20. That is, radar system 10 produces a frequency and amplitude modulated beam of continuous wave electromagnetic energy. Such AM-FM CW laser beam is transmitted toward a target (not shown) via beam expander 40, scanner 42 and afocal telescope 44. Portions of the transmitted AM-FM CW beam are reflected by clutter (not shown) disposed near the system 10 (i.e., within the short ambiguous range interval of the AM waveform). Other portions of the AM-FM CW signal are reflected by a target or targets and return to radar system 10. Both clutter-reflected and target-reflected return signals are received as AM-FM CW energy by afocal telescope 44, scanner 42 and beam expander 40 and are directed, as discussed, by Brewster plate 32 onto beam combiner 36. The frequency of the target return signal over time is represented at point B in FIG. 1 and waveform 3B of FIG. 3. As shown, the carrier component of the return signal has a nominal frequency of $f_c+f_D$, with the upper sideband component having a nominal frequency of $f_c+f_m+f_D$ and the nominal frequency of the lower sideband component being $f_c-f_m+f_D$. The symbol $f_D$ here denotes the Doppler frequency shift of the received signal, which manifestly is the same for the carrier and sideband components. As is known, $f_D$ is represented by the equation:

$$f_D = \frac{2V}{\lambda} \quad (2)$$

where V is the velocity of the target relative to radar system 10 ($f_D$ being positive for an approaching target, which is assumed here), and $\lambda$ is the wavelength of the transmitted signal, here on the order of 10.6 μm. The received signals at point B are also frequency modulate by the amount B in a time period T, as shown, and are delayed in time by an amount $t_R$, representing the range delay of the target, from the transmitted signals at point A. The range delay $t_R$ is represented by the well-known formula:

$$t_R = \frac{2R}{c} \quad (3)$$

where C is the speed of light and R is the range of the target.

The L.O. beam applied to beam combiner 36 is represented by waveform 3C, which is an FM-CW waveform of nominal frequency $f_c$ with a modulation frequency B applied thereto in a period T. It is noted that the L.O. beam is not applied with any amplitude modulation by AM modulator 90, as can also be seen by observation of FIG. 1. The L.O. beam is, as discussed, combined with the return beam by combiner 36 and the combined beams directed to detector 50 via lens 49.

Detector 50 responds to the signals incident thereon as discussed to produce a beat frequency signal on line 51, indicated as point D in FIG. 2 and shown as waveform 3D in FIG. 3. The beat frequency signal is a CW signal having any FM components removed in the mixing process of detector 50. The frequency of such signal is the beat or difference frequency between the return signal and the L.O. signal, except during the transitions of the FM waveform between the up-ramp and down-ramp, such transition periods being ignored, as is known. Since the return signal is an AM signal, the beat frequency signal is an AM signal as well, having a carrier component and upper and lower sideband components. During the "up-ramp" of the FM signal, the beat frequency of the carrier output component of the detector is $f_D - f_R$, the frequency of the upper sideband component is $f_D - f_R + f_m$, and that of the lower sideband component is $f_D - f_R - f_m$. The symbol $f_R$ denotes the frequency shift in the output of detector 50 due to the range of the target. As is well-known:

$$f_R = \frac{B}{T} \cdot t_R = \frac{2BR}{cT} \quad (4)$$

where: R is the target range, B is the peak-to-peak FM deviation, c is the speed of light, and T equals the duration of the FM ramp. Here it is assumed that the absolute value of $f_R$ is less than the absolute value of $f_D$. As is known, the frequency $f_R$ is positive during the FM up-ramp and negative during the down-ramp of the FM. Hence, during the down-ramp, the carrier output component of detector 50 has a beat frequency of $f_D + f_R$, while the beat frequency of the upper and lower sideband components thereof are $f_D + f_R + f_m$ and $f_D + f_R - f_m$, respectively. The AM-beat-frequency output of detector 50 is applied to FM subsection 160 of receiver section 60.

In understanding the operation of FM subsection 160, it is necessary to consider only the carrier component of the beat-frequency signal produced by detector 50, that is, the center trace of waveform 3D. However, it is understood that FM subsection 160 also processes the sideband components of waveform 3D. The beat frequency signal is amplified in amplifier 161 and applied to the input port of mixer 162. Mixer 162 responds to a control signal having a predetermined nominal frequency $f_o$ from VCO 168 to produce an intermediate output signal at point E having a frequency equal to the sum of the beat frequency signal and control signal $f_o$, the suitable output filtering of mixer 162 not being shown. Thus, the carrier component of the intermediate signal has a frequency of $f_o + f_D - f_R$ during the FM up-ramp and a frequency of $f_o + f_D + f_R$ during the down-ramp. Such carrier component is represented by waveform 3E. A little thought reveals that the average frequency of the carrier component is $f_o + f_D$. It is noted in passing that in practice mixer 162 is implemented using an arrangement of mixers rather than the single mixer shown in FIG. 2. A preferred embodiment of such mixer arrangement is shown in FIG. 4 and is discussed hereinafter. A single mixer 162 is shown and discussed here to aid in understanding the theory of operation of receiver section 60.

The output of mixer 162 is fed to conventional SAW analyzer 170 in FM processor 164. Here, the SAW analyzer is implemented as a chirp-Z-transform SAW line processor, which functions as a spectrum analyzer to resolve and transform multiple frequency signals from the frequency domain to the time domain and can perform simple algorithms to select among such signals—for example, selection by amplitude (to choose the strongest signal), or by frequency (to select the highest frequency signal, for example). SAW analyzer 170 is triggered by the triangular FM waveform produced by FM driver 82 to internally generate a pulsed sinusoidal signal within a predetermined time frame, such sinusoidal signal having a frequency which is a linear function of time over the predetermined time frame. That is, SAW analyzer 170 internally generates a "frequency chirped" sine wave pulse during such time frame. Here, a plurality, such as two, of such time frames occur during each of the FM up- and down-ramps. During each time frame, the chirped sine wave pulse is mixed with the signal applied to SAW analyzer 170 from mixer 162, with the signal obtained thereby being applied to a dispersive delay line which has a linear delay- vs. -frequency characteristic matched to the frequency chirped sine wave pulse. Such dispersive delay line compresses the frequency chirped sine wave pulse into a pulsed waveform having a position in time within the predetermined time frame which is proportional to the frequency of the signal applied to SAW analyzer 170 from mixer 162 (i.e., the instantaneous frequency of waveform 3E). Such pulsed waveform is applied to counter 173 on line 175a. Also applied to counter 173 is a timing signal on line 175b. The timing signal on line 175b triggers the counter to begin counting at the start of each of the time frames of SAW analyzer 170, that is, at the beginning of each frequency-chirped sine wave pulse thereof. The counter 173 stops counting upon the occurrence of the pulsed waveform on line 175a. The output of counter 173 is a signal having a magnitude corresponding to the time delay between the trigger on line 175b and the pulsed waveform on line 175a, such time delay being proportional to the instantaneous frequency of the waveform 3E, as discussed. A constant of proportionality, here denoted $K_1$, will exist between such counter output signal and the frequency of the signal applied to SAW analyzer 170 from mixer 162. Thus, during the FM up-ramp, the magnitude of the counter 173 output signal is:

$$V_{up} = K_1(f_o + f_D - f_R) \quad (5)$$

and during the FM down-ramp such counter 173 output signal magnitude is:

$$V_{down} = K_1(f_o + f_D + f_R) \quad (6)$$

It is noted that signals $V_{up}$, $V_{down}$ have a nominal, average magnitude of $K_1(f_o + f_D)$ and vary instantaneously therefrom by an amount proportional to $\pm f_R$.

Such signals $V_{up}$, $V_{down}$ are fed to post-processor 172, a conventional device which manipulates the signals $V_{up}$, $V_{down}$ according to the following simple equations to solve for $f_R$ (the Doppler frequency shift due to target range), $V_R(\text{coarse})$ (the approximate range of the target), and $f_D$ (the Doppler frequency shift of the target), respectively:

$$f_R = \frac{V_{down} - V_{up}}{2K_1} \quad (7)$$

$$V_R(\text{coarse}) = \frac{cTf_R}{2B} \quad (8)$$

$$f_D = \frac{V_{down} + V_{up}}{2K_1} \quad (9)$$

Equations (7), (9) are derived from *Introduction to Radar Systems*, by M. I. Skolnik, published by McGraw-Hill Book Company, Inc. 1962, in section 3.3, entitled "Frequency-Modulated CW Radar". Equation (8) merely restates well-known equation (4). The signal $f_D$ is converted to a voltage $V_D$ in a conventional manner (such as by a frequency-to-voltage converter, not shown) and coupled to utilization device 70 on line 176, as is the approximate target range signal, $V_R$(coarse), on line 178.

Post-processor 172 also produces a third output signal, $V_L$, which is averaged in integrator 174 and applied to control the output frequency of VCO 168. Post-processor 172 generates $V_L$ by conventionally subtracting a reference signal $V_{REF}$ from the sum of $V_{down}$ and $V_{up}$. The function of the feedback loop through VCO 168 and mixer 162 is to force $V_L$ to zero volts. Thus, from equations (5) and (6), it is seen that the magnitude of $V_{REF}$ is selected to be $2K_1 (f_o+f_D)$ As discussed, and as can be seen from waveform 3E, $(f_o+f_D)$ is the average frequency of the waveform 3E—that is, the average frequency of the signal applied to SAW analyzer 170. A little thought thus reveals that such feedback loop holds the average frequency of waveform 3E constant at $(f_o+f_D)$ Thus, it is seen that $V_L$ is a control signal having a value corresponding to an error between the actual average frequency at point E and a predetermined average frequency, here $(f_o+f_D)$ Therefore, the output frequency of VCO 168 is selected to be $f_o$ when $V_L$ equals 0 volts. Thus, it is seen that the feedback loop holds the average frequency at point E constant at a predetermined average frequency $(f_o+f_D)$ Here, $(f_o+f_D)$ is selected to be the center frequency, $f_{SAW}$, of SAW analyzer 170, thereby allowing use of the entire bandwidth of SAW analyzer 170 to measure target range (i.e., $\pm f_R$) Thus it is seen that the frequency of waveform 3E will have a nominal average frequency of $(f_o+f_D)$ and will vary instantaneously from such average frequency according to $\pm f_R$.

As discussed, post-processor 172 in FM section 160 applies a signal $V_R$(coarse) representing the approximate range of the target to utilization device 70. Utilization device 70 calculates the approximate range of the target from $V_R$(coarse). However, the range information thereby obtained is not sufficiently accurate to provide an image of the target to enable the target to be identified or "classified". Such range inaccuracy is due to unavoidable errors of nonlinearity in the FM up- and down-ramps arising from performing electromechanical frequency modulation of CW laser 20 by PZT stack 84. It is recalled, however, that the FM modulation frequency is typically selected to generate long ambiguous range intervals. Additionally, as has been discussed, such FM waveform has high resolution; that is, the FM waveform allows a selected target to be resolved from atmospheric clutter and from other targets. Thus, the FM waveform applied to the beam produced by laser 20 is highly suitable for separating a desired target from atmospheric clutter and from other targets while simultaneously measuring the approximate range of such desired target.

AM section 260 responds to the output of mixer 162 (at point E) and the output of SAW analyzer 170 to provide utilization device 70 with a signal $V_R$(fine) representing a highly accurate measurement of target range, such measurement having poor resolution (i.e., the inability to distinguish one target from another or from atmospheric clutter) and short ambiguous range intervals, as will be described. As discussed, the feedback loop comprising VCO 168 holds the average frequency of the signal at point E constant at a nominal frequency $(f_o+f_D)$ equal to the center frequency $(f_{SAW})$ of SAW analyzer 170, such frequency at point E varying instantaneously according to $\pm f_R$. Thus, the output of SAW analyzer 170 and counter 173 during the FM up-ramp and $V_{down}$ during the down-ramp) simply follow $f_R$ (see equations 5, 6). Such signals are applied to the input of VCO 266 through clutter threshold 171. It should be noted that while $V_{up}$ and $V_{down}$ have been referred to as separate signals, they are present at a single output of counter 173—they merely exist at different times, the former during the FM up-ramp and the latter during the FM down-ramp. Clutter threshold 171 substantially prevents output signals from SAW analyzer 170 and counter 173 due to return signals from near-field atmospheric clutter from being applied to VCO 266. As stated, SAW analyzer 170 generates a pulsed waveform on line 175a at a time during a predetermined time frame which corresponds to the instantaneous frequency of the signal applied to the input of SAW analyzer 170. Since such instantaneous frequency corresponds to the range of objects producing the return signals (i.e., targets, near-field atmospheric clutter), during each SAW analyzer time frame pulsed waveforms corresponding to near-field atmospheric clutter will occur before the pulsed waveforms corresponding to targets. Thus, the time delay measured by counter 173 will be low for return signals from near-field atmospheric clutter. Hence, the magntiude of the output of counter 173 for such clutter will also be low. Clutter threshold 171 is adjusted to prevent input signals applied thereto having a magnitude below a predetermined value from being coupled to VCO 266. The predetermined threshold value is determined empirically to correspond to the limit of the near-field of radar system 10, the near-field being defined, as is well-known, by the square of the antenna aperture divided by the wavelength of the transmitted signal. Thus, returns from near-field atmospheric clutter are rejected by clutter threshold 171 and substantially prevented from being applied to VCO 266 in AM section 260. It is noted that clutter threshold 171 may alternately be implemented as a delay on counter 173. That is, counter 173 may be adjusted to delay counting for a predetermined time, corresponding to the near-field range of radar system 10, after the occurrence of the trigger signal on line 175b, thereby ignoring return signals from near-field atmospheric clutter.

VCO 266 here is selected to have a frequency-to-voltage proportionality constant equal to $1/K_1$ and to introduce an offset frequency $f_x$ onto the frequency signal produced thereby. Thus, the waveform produced by VCO 266 (at point F) corresponds to waveform 3F, such waveform having a carrier-component frequency of $f_x+f_o+f_D-f_R$ during the FM up-ramp and carrier-component frequency of $f_x+f_o+f_D+f_R$ during the down-ramp. It is noted that the output of VCO 266 has a nominal, average frequency of $(f_x+f_o+f_D)$, such frequency varying instantaneously according to $\pm f_R$. Such VCO-output signal is applied to the mixer ports of mixers 264a–264c. The output of mixer 162 is applied through conventional delay line 262 to the input ports of mixers 264a–264c. The amount of such delay is chosen empirically to account for the time taken by SAW analyzer 170, counter 173, clutter threshold 171 and VCO 266 to process the signals applied thereto and to produce waveform 3F at mixers 264a–264c.

The signal applied to the input ports of mixers 264a–264c from mixer 162 is, as discussed, amplitude modulated and has a carrier component waveform and upper and lower sideband component waveforms corresponding to waveform 3G. The carrier waveform component corresponds to the center trace of waveform 3G, with the upper and lower traces thereof corresponding to the upper and lower sideband components, respectively. The carrier component frequency during the FM up-ramp is $f_o+f_D-f_R$ and is $f_o+f_D+f_R$ during the down-ramp. The frequency of the upper sideband component is $f_o+f_D+f_m-f_R$ and $f_o+f_D+f_m+f_R$ during the FM up-ramp and down-ramp, respectively. During the FM up-ramp, the frequency of the lower sideband component is $f_o+f_D-f_m-f_R$, such frequency being $f_o+f_D-f_m+f_R$ during the down-ramp. Mixer 264a is utilized for the carrier component of waveform 3G, with mixers 264b, 264c being used for the upper and lower sidebands, respectively, of such waveform 3G. The conventional filtering at the output ports of mixers 264a, 264b, 264c to dedicate such mixers to the carrier, upper sideband and lower sideband components, respectfully, is not shown. Each of mixers 264a-264c applies waveform 3F from VCO 266 to the delayed input signals from mixer 162. Thus, the output of mixer 264a, fed to filter 268a, is a CW signal having a frequency of $f_x$. Similarly, it is seen that the output of mixer 264b is a CW signal with a frequency of $f_x+f_m$, such signal being applied to filter 268b. Coupled to filter 268c is the CW output of mixer 264c, having a frequency of $f_x-f_m$. Thus, the outputs of mixers 264a-264c represent the amplitude modulation on the target-reflected return signal with Doppler range frequency $f_R$, Doppler velocity frequency $f_D$ and offset frequency $f_o$ information having been removed therefrom. Thus, it is noted that the output signals of mixers 264a-264c are independent of target range and Doppler velocity.

Filters 2668a-268c are conventional narrow bandpass filters, here having a passband 50 to 150 KHz wide. Filters 268a-264c have center frequencies corresponding to $f_x$, $f_x+f_m$, and $f_x-f_m$, respectively, thereby effectively allowing only signals due to target-reflected returns to pass therethrough to conventional combiner/envelope detector 270. It is specifically noted that clutter-reflected-return signals which may be present on the signal applied to mixers 264a-264c from mixer 162, are prevented from being applied to detector 270 by filters 268a-268c. As discussed, such filters 268a-268c are narrow-band filters, here having passbands of 50-150 KHz. It is noted that in addition to the carrier component of the target return signal shown in waveform 3E, the signal at point E fed to mixers 264a-264c also includes a clutter return signal from the near-field of radar system 10, such clutter-return signal having a Doppler range frequency $f_R'$ substantially different from (i.e., less than) that of the target ($f_R$) That is, since the near-field atmospheric clutter sensed by detector 50 is located close to radar system 10, the Doppler range frequency, $f_R'$, thereof will typically be much less than that of a selected target. It is recalled that clutter threshold 171 removes clutter-return components from the signal applied to VCO 266, as discussed. Thus, the output signals from mixers 264a, 264b, 264c, which, as discussed, here will have frequencies of $f_x$, $f_x+f_m$ and $f_x-f_m$, respectively, will also comprise frequency components due to the Doppler range frequency, $f_R'$, of near-field clutter-return signals. However, such clutter-return frequency components will typically vary from the midband frequencies of narrow-band filters 268a, 268b, 268c (i.e., $f_x$, $f_x+f_m$, $f_x-f_m$, respectively) by greater than the passband (here, 50-150 KHz) of such filters 268a-268c. Thus, it is seen that such filters 268a-268c substantially remove clutter-return signal components from the AM envelope signals applied to combiner/envelope detector 270.

Combiner/envelope detector 270 combines the signals applied thereto from filters 268a-268c to conventionally re-form an AM signal on line 272 having a carrier frequency amplitude modulated at a frequency $f_m$ to form an envelope on such carrier frequency. It is noted that such AM signal has no FM component thereon from FM unit 80. The AM envelope is conventionally detected and produced on line 272. The phase of such envelope is measured in phase detector 274 with respect to the reference phase of the amplitude modulation envelope signal $f_m$ applied by AM driver 92 and AM modulator 94 to the laser beam in interferometer 30. Such reference signal $f_m$ is coupled to phase detector 274 from AM driver 92, as shown in FIGS. 1 and 3. Such phase comparison may be performed, for example, by measuring the delay of positive-going zero crossings between the envelope signal on line 272 and the reference envelope signal $f_m$, and yields a phase difference signal $\theta$. Conventional phase-difference-measurement circuitry is capable of measuring such phase difference signal 8 quite accurately, such as within 10°. The fine target range ($V_R$(fine)) is then calculated by detector 274 from equation (1), which is repeated here:

$$R_{fine} = V_R(\text{fine}) = \frac{c\theta}{4\pi f_m} \quad (10)$$

Such fine-range signal $V_R$(fine) is coupled along line 276 to utilization device 70 for calculation of exact target range.

As discussed, exact target range cannot be obtained from $V_R$(fine) alone because such signal has poor resolution. That is, it is difficult to resolve return signals reflected by a selected target from return signals reflected by other targets or by atmospheric clutter using AM modulation on the transmitted signal, since the accuracy to which the phase difference $\theta$ due to a selected target may be measured is degraded by returns from other sources (such as other targets or atmospheric clutter) which produce different phase differences $\theta'$, $\theta''$, etc. The AM waveform is also highly ambiguous with regard to the approximate range of the target. That is, it cannot be determined from $V_R$(fine) whether a particular phase difference signal is $\theta$ or $\theta+2\pi$ or $\theta+4\pi$, etc. Thus, the maximum range for which $V_R$(fine), standing alone, is an unambiguous target range signal is when $\theta=2\pi$. From an analysis of equation (10), a little thought reveals that for any substantial AM frequency (such as greater than 1 MHz), the ambiguous range interval of the AM waveform is much too short for $V_R$(fine) alone to be a valid measurement of actual target range. However, it is noted that within this narrow "range window", $V_R$(fine) is very accurate, since the phase difference may conventionally be measured quite precisely. Thus, the signal $V_R$(fine) may be utilized as a "vernier" on $V_R$(coarse) to detect the shape of the target and thereby allow the target to be identified or "classified".

Utilization device 70 combines the coarse target range signal $V_R$(coarse), from FM subsection 160, and fine target range signal $V_R$(fine), from AM subsection 260, to accurately and unambiguously determine the range of a selected target and the features thereof while resolving such selected target from unselected targets and from atmospheric clutter. That is, the high-resolution, range-unambiguous signal $V_R$(coarse) gives an indication of the approximate range of the selected target, thereby distinguishing the selected target from unselected targets and from atmospheric clutter. As discussed, such signal $V_R$(coarse) is not, however, accurate enough to provide information on the shape and details of the target. The fine target range signal $V_R$(fine) is used as a "vernier" on $V_R$(coarse) to determine the precise range of the target and to provide the shape and details of the target, thereby allowing the target to be identified or classified. As previously noted in equations (8) and (10), $V_R$(coarse) and $V_R$(fine) are represented as follows:

$$V_R(\text{coarse}) = \frac{cTf_R}{2B} \qquad (11)$$

$$V_R(\text{fine}) = \frac{c\theta}{4\pi f_m} \qquad (12)$$

Utilization device 70 combines such range signals $V_R$(coarse) and $V_R$(fine) to calculate the exact range R of the target according to the following formula:

$$R = \frac{c}{2f_m}\left(N + \frac{\theta}{2\pi}\right) \qquad (13)$$

where $\theta$ is the phase difference measured by phase detector 274. The number N is an integer determined by utilization device 70 from $V_R$(coarse), that is, from the approximate target range provided by $V_R$(coarse). The value of N is chosen to be that which makes the actual range R and the approximate range $V_R$(coarse) to be the most equal.

It is noted that radar system 10 has been described for a known, constant target Doppler velocity frequency $f_D$. Such constant frequency $f_D$ may be achieved by mounting radar system 10 on a constantly moving platform with respect to targets, the constant velocity of the platform corresponding to $f_D$. Alternately, in a heterodyne system, the platform may be stationary and the frequency of the L.O. laser offset from that of laser 20 by $f_D$. From the center trace of waveform 3D, it is seen that the carrier component of the beat-frequency signal at point D (FIG. 1) has an average frequency of $f_D$ and varies instantaneously from $f_D$ by a frequency $\pm f_R$ corresponding to the range of a selected target. Thus, referring to waveform 3D, the carrier component changes frequency from $(f_D-f_R)$ during the FM up-ramp to $(f_D+f_R)$ during the down-ramp. In order to avoid requiring SAW analyzer 170 to process one set of frequencies during the up-ramp and another set of frequencies during the down-ramp, and also to utilize the maximum amount of SAW analyzer bandwidth, in the preferred embodiment mixer 162 is implemented as shown in FIG. 4 to comprise a pair of parallel mixers 362a, 362b having input ports fed by the output of amplifier 161. The output ports of mixers 362a, 362b are coupled in parallel to a time multiplexer 363, the output of which feeds SAW analyzer 170. The output of multiplexer 363 is also coupled along line 165 to delay 262 in AM section 260. The mixer ports of mixers 362a, 362b receive output signals from double balanced mixer 364. Applied to the input and mixer ports of mixer 364 are a CW output signal from crystal oscillator 366 and the output of VCO 168, respectively. Time multiplexer 363 is controlled by the FM ramp signal produced by FM driver 82 to apply the output of mixer 362a to SAW analyzer 170 (and delay line 262) during the up-ramp portion of the FM waveform, and to apply the output of mixer 362b to such SAW analyzer 170 (and delay line 262) during the down-ramp portion of the FM waveform.

Here, crystal oscillator 366 produces a CW signal having a reference frequency $f_{co}$. As previously discussed, VCO 168 is selected to produce a predetermined frequency $f_o$ when control signal $V_L$ equals 0 volts. A first output of mixer 364 comprises the frequency sum between oscillator 366 and VCO 168, and is thus a CW signal at a frequency $(f_{co}+f_o)$, such first output being coupled to mixer 362a. Coupled to mixer 362b is a second output of mixer 364 comprising the frequency difference of the oscillator 366 and VCO 168 signals, that is, a frequency $(f_{co}-f_o)$. Suitable filtering (not shown) at the output of mixer 362a permits only the frequency difference output of such mixer 362a $[(f_{co}+f_o)(f_D-f_R)]$ to be coupled to multiplexer 363. Filters (not shown) at the output of mixer 362b allow only the frequency sum output of such mixer 362b $(f_{co}-f_o)+(f_D+f_R)]$ to pass to multiplexer 363. In the preferred embodiment, frequencies $f_o$ and $f_D$ are selected to be equal. Thus, neglecting for a moment the effects of target return signals (i.e., $\pm f_R$), during the FM up-ramp and down-ramp time periods, the signal applied to SAW analyzer 170 has a frequency of $f_{co}$, such frequency being selected to be the center frequency of SAW analyzer 170. If such frequency drifts, for example due to time- or temperature-induced frequency fluctuations in the output of oscillator 366 or VCO 168, the error signal $V_L$ generated by FM processor 164 assumes a value different from 0 volts, thereby shifting the output frequency of VCO 168 from $f_o$ until the input signal of SAW analyzer 170 is re-established at $f_{co}$.

As previously discussed, detection of a target at a given range produces an $f_R$ determined by equation (4). During the FM up-ramp, the carrier signal component applied to SAW analyzer 170 is from mixer 362a and, with $f_o=f_D$, such carrier signal component has a frequency of $f_{co}+f_R$. During the FM down-ramp, the carrier signal component applied to SAW analyzer 170 is from mixer 362b and also has a frequency of $f_c+f_R$ (with $f_o=f_D$). Thus, it is seen that the arrangement of mixer unit 162 according to FIG. 4 produces an input signal for SAW analyzer 170 (and delay line 262) having a constant frequency for a given target range (and hence $f_R$) during both the FM up-ramp and down-ramp, thereby allowing utilization of the full bandwidth of SAW analyzer 170 to process target range signals ($f_R$) That is, the frequency shift in such signal due to the range of the target is the same polarity, here $+f_R$, for both the FM up- and down-ramps. Therefore, each trace of waveforms 3E, 3F, 3G would not actually change frequency as the FM ramp switches between an up-ramp and a down-ramp when mixer 162 is implemented as shown in FIG. 4. Rather, each trace would be a signal having a constant frequency $(f_{co}+f_R)$ for both the up-ramp and down-ramp times. However, such does not affect the ranging operation of receiver 60. That is, the signal $(V_{up}, V_{down})$ produced by SAW analyzer 170 and counter 173 has a nominal magnitude with variations thereon corresponding to $f_R$. Post processor 172 responds to such signal in the manner previously discussed and in accordance with equations (5), (6), and (7) to produce the approximate range output signal, $V_R$(coarse) on line 178.

As discussed, VCO 266 is selected to produce an output signal having a nominal, average frequency in response to the nominal magnitude of the output signal of SAW analyzer 170 and counter 173. The constant of proportionality of VCO 166 is selected to vary the output frequency thereof in accordance with variations in $f_R$. It is noted that by utilizing the mixer arrangement of FIG. 4, the signal applied to the input of VCO 166 will be constant for a given target range (and hence $f_R$) during both the FM up-ramp and down-ramp, since the shift in the magnitude of such signal due to target range is the same polarity (here, positive for $+f_R$) during the up-ramp and down-ramp. Thus, the output frequency of VCO 266 does not change due to the ramp polarity of the FM signal (i.e., the up-ramp or the down-ramp). The output frequency of VCO 266 changes only in accordance with changes in target range.

Having described a preferred embodiment of the present invention, modifications and alterations may become apparent to those of ordinary skill in the art. Thus, it is understood that the scope of this invention is to be limited only by the scope of the appended claims.

What is claimed is:

1. A laser radar system comprising:
    means for generating a beam of continuous wave electromagnetic energy, said generating means comprising means for producing a frequency and amplitude modulated beam of continuous wave electromagnetic energy, such producing means comprising: means for modulating the frequency of such continuous wave beam from a nominal frequency; and means for modulating the amplitude of such continuous wave beam from a nominal amplitude at a reference envelope frequency $f_m$, said reference envelope having a reference phase;
    means for directing said frequency and amplitude modulated beam of energy toward a target;
    means for receiving portions of such directed beam of energy reflected by the target;
    means, responsive to the frequency modulation of the received portions of the frequency and amplitude modulated beam of energy, for producing a first signal representative of the approximate range of the target; and
    means responsive to the amplitude modulation of the received portions of the frequency and amplitude modulated beam of energy, for producing a second signal representative of variations in the approximate range of the target, said second signal producing means comprising: means, responsive to the received portions of target reflected energy, for producing a second amplitude modulated signal having a second envelope at the reference frequency $f_m$; and means for comparing the phase of the reference envelope and the second envelope, with the phase difference therebetween being representative of variations in the approximate range of the target.

2. The radar system of claim 1 wherein the frequency modulating means changes the frequency of the continuous wave beam by a predetermined amount in a predetermined time period, and further comprising:
    means for producing a local oscillator beam of continuous wave electromagnetic energy;
    means for combining received portions of target-reflected energy with the local oscillator beam of energy to produce a beat frequency signal having a frequency component $f_R$ representative of the range of the target; and
    wherein the first signal producing means comprises:
        (i) means for detecting the frequency component $f_R$ representative of the range of the target; and
        (ii) means for processing such frequency component $f_R$ in accordance with the predetermined modulation amount and time period to produce the first signal representative of the approximate range of the target.

3. The radar system of claim 2 wherein the frequency component $f_R$ detecting means comprises:
    means, responsive to the beat frequency signal, for producing an intermediate signal having a nominal frequency, the frequency of the intermediate signal varying instantaneously from the nominal frequency in accordance with $f_R$; and
    spectrum analyzer means, responsive to the intermediate signal, for generating an output signal having a predetermined average magnitude, such output signal magnitude varying instantaneously from such average magnitude in accordance with $f_R$.

4. The radar system of claim 3 further comprising means, responsive to the average magnitude of the output signal of the spectrum analyzer means, for maintaining such average magnitude at the predetermined average magnitude.

5. The radar system of claim 4 wherein the average value maintaining means for the spectrum analyzer output signal comprises:
    means for producing a control signal in accordance with an error between the average value of the spectrum analyzer means output signal and the predetermined average value; and
    wherein the intermediate signal producing means comprises means for varying the nominal frequency of the intermediate signal in accordance with the control signal to minimize said error.

6. The radar system of claim 2 further comprising means, responsive to the detected frequency component $f_R$, for producing a signal representative of a velocity of the target.

7. A laser radar system comprising:
    means for generating a continuous wave beam of electromagnetic energy having a nominal frequency and amplitude, said generating means comprising means for modulating the frequency of such continuous wave beam from the nominal frequency;
    means for directing such beam of energy toward a target, such target reflecting portions of the directed beam of energy;
    means for receiving such target-reflected portions of the directed beam of energy, such receiving means comprising means for deriving the approximate range of the target from the frequency modulation of received target-reflected portions of the directed beam of energy;
    means for producing a vernier target range for the derived approximate target range, such vernier target range producing means comprising:
        (i) means, disposed between the beam generating means and the beam directing means, for modulating the amplitude of the frequency modulated continuous wave beam of energy from the nominal amplitude at a predetermined amplitude modulation frequency $f_m$; and (ii) means, responsive to the amplitude modulation of the received target-reflected portions of the directed beam of energy, for producing an output signal representative of variations in the approximate range of the target;

means for combining the output signal representative of variations in the approximate range of the target with the derived approximate range of the target to produce a signal representative of the actual range of the target;

means for producing a local oscillator beam of continuous wave energy, the local oscillator beam being frequency modulated and having substantially no amplitude modulation thereon; and means for combining received portions of target-reflected energy with the local oscillator beam to produce a beat frequency signal having a frequency component $f_R$ representative of the range of the target;

the approximate range deriving means further comprising:

(i) means, responsive to the beat frequency signal, for producing a first signal having a first nominal frequency including a frequency component corresponding to $f_m$, the frequency of such first signal varying instantaneously from the nominal frequency in accordance with $f_R$; and (ii) means, responsive to the first signal for producing a second signal having a predetermined, average value, such second signal value varying instantaneously from such predetermined average value in accordance with $f_R$;

the output signal producing means further comprising:

(i) means, responsive to the second signal, for producing a reference signal having a second nominal frequency offset from the first nominal frequency of the first signal by a predetermined amount, the frequency of the reference signal varying instantaneously from the second nominal frequency in accordance with $f_R$;

(ii) means, responsive to the first signal and the reference signal, for producing a third signal, such third signal being amplitude modulated at the frequency $f_m$; and (iii) means for comparing the phase of the amplitude modulation of the third signal with a reference phase, the phase difference therebetween being representative of variations in the approximate range of the target.

8. The radar system of claim 7 wherein the frequency modulating means modulates the frequency by a predetermined amount in a predetermined time period, the approximate range deriving means further comprising:

means for processing the second signal in accordance with such predetermined frequency modulation amount and period to determine the approximate range of the target.

9. The radar system of claim 7 wherein the receiving means additionally receives portions of the directed beam of energy reflected by atmospheric clutter, such clutter-reflected energy having a frequency component $f_R'$, representative of the range of such clutter, the value of the second signal varying instantaneously in accordance with $f_R'$, the output signal producing means further comprising:

means, disposed between the second signal producing means and the reference signal producing means, for substantially preventing values of the second signal corresponding to $f_R'$ from being coupled to the reference signal producing means.

10. The radar system of claim 9 wherein the frequency of the first signal varies instantaneously in accordance with $f_R'$, the third signal producing means comprising means for substantially filtering out such frequency $f_R'$.

11. The radar system of claim 7 wherein the frequency modulating means changes the frequency of the continuous wave beam in a modulation period, the target range frequency component $f_R$ having opposite polarities during first and second portions of the period, the first signal producing means further comprising means for producing instantaneous frequency variations having a single polarity on the nominal frequency of the first signal n accordance with $f_R$.

12. A laser radar system comprising:

means for generating a beam of continuous wave electromagnetic energy;

means for imposing frequency modulation on the continuous wave beam of energy;

means for producing amplitude modulation of the frequency modulated beam of continuous wave energy at a reference envelope frequency $f_m$, said reference envelope having a reference phase;

means for transmitting the amplitude and frequency modulated beam of continuous wave energy toward a selected target;

means for receiving portions of the transmitted beam of energy reflected by the selected target, such received portions reflected by the selected target having amplitude and frequency modulation thereon, said receiving means also receiving portions of the transmitted beam reflected by unselected targets and by atmospheric clutter;

means, responsive to the frequency modulation on the received portions reflected by the selected target, for produced a first signal representative of the approximate range of the selected target, such first signal substantially resolving the selected target from unselected targets and from atmospheric clutter and having a relatively long ambiguous range interval;

means, responsive to the amplitude modulation on the received portions reflected by the selected target, for producing a second signal representative of the accurate range of the selected target within a relatively short ambiguous range interval, such second signal producing poor resolution between the selected target and the unselected targets and atmospheric clutter, the second signal producing means comprising: means, responsive to the received portions of target-reflected energy, for producing a second amplitude modulated signal having a second envelope at the reference frequency $f_m$; and means for comparing the phase of the reference envelope and the second envelope, with the phase difference therebetween being representative of variations in the approximate range of the target; and means for combining the first and second signals to produce an output signal having the relatively high resolution and long ambiguous range interval of the first signal and providing the accurate selected target range measurement of the second signal.

* * * * *